Patented Aug. 24, 1948

2,447,773

UNITED STATES PATENT OFFICE 2,447,773

METHOD OF PREPARING POLYVINYL ACETAL KETAL RESINS

Joseph D. Ryan, Toledo, Ohio, and Fred B. Shaw, Jr., Baltimore, Md., assignors to Libbey-Owens-Ford Glass Company, Toledo, Ohio, a corporation of Ohio No Drawing. Application January 30, 1943, Serial No. 474,180

4 Claims. (Cl. 260—66)

Our invention relates to a new method for the preparation of polyvinyl acetal ketal resins.

Structurally, the polyvinyl acetal ketal resins contain, as basic groups within the same molecule, vinyl acetal groups, vinyl ketal groups, vinyl alcohol groups, and vinyl ester groups. For the preparation of polyvinyl acetal ketal resins by our method, any particular aldehyde or ketone may be employed.

The resins of our invention are superior to and are intended to replace the polyvinyl acetal resins which are at present used for the manufacture of laminated safety glass, photographic films, coatings for fabrics, etc.

Prior to our invention, polyvinyl ketal acetal resins have been prepared by using as a starting product polyvinyl esters, more particularly polyvinyl acetate. In the methods described in the prior art, the polyvinyl ester is subjected to partial hydrolysis and the desired ketone added and reacted with one of the hydroxyl groups formed by the hydrolysis process. At this stage, the desired aldehyde in proper proportion is added and reaction then allowed to go to completion.

In the method of our invention, we start with a polyvinyl acetal resin instead of employing a polyvinyl ester. To carry out our process, the desired polyvinyl acetal resin is dissolved in an anhydrous medium in the presence of a catalyst and the ketone to be reacted is added in the proper proportions and the mixture allowed to stand, preferably at room temperature, care being taken to control the time of reaction to obtain a resin having the desired analysis. In some cases, mixtures of aldehyde and ketones may replace the ketone alone.

We have found that the compositions of the resins made by our method can be varied by varying the ratio of aldehyde to ketone used and also by varying the ratio of the total weight of the aldehyde and ketone employed to the weight of original resinous starting material. We have further established that the ratio of ketone to aldehyde in the finished resin can be governed by adding the ketone first and then governing the amount of time the mixture is allowed to stand before the addition of more aldehyde. Contrary to what would normally be expected in such a chemical reaction, the longer the mixture of polyvinyl acetal resin, catalyst, aldehyde and ketone are allowed to stand, after a short initial period, the more free hydroxyl groups are found in the resin material.

As a specific method of carrying out our invention, the following procedure is outlined:

132 grams of polyvinyl butyral resin analyzing as follows:

| | Per cent |
|---|---|
| Vinyl alcohol (calculated as polyvinyl alcohol) | 19.1 |
| Vinyl acetate (calculated as polyvinyl acetate) | 1.15 |
| Vinyl butyral (calculated as polyvinyl butyral) | 79.3 | was dissolved in 750 cc. of methanol. 500 cc. of methyl isobutyl ketone and 400 cc. of methanolic-HCl (2.75 normal) were added and the mixture allowed to stand for 24 hours. At the end of 24 hours, the mixture had formed a hard gel. 500 cc. of normal butyraldehyde was added and the whole was stirred until the gel went into solution. The resin was then precipitated by throwing the solution into water. The resin product was then filtered off, washed free of acid catalyst, and dried.

Analysis of the product:

| | Per cent |
|---|---|
| Vinyl acetate (calculated as polyvinyl acetate) | .5 |
| Vinyl alcohol (calculated as polyvinyl alcohol) | 11.0 |
| Vinyl methyl isobutyl ketal (calculated as polyvinyl methyl isobutyl ketal) | 50.82 |
| Vinyl butyral (calculated as polyvinyl butyral) | 37.68 |

Another specific method for carrying out our invention is as follows:

135 grams of polyvinyl formal resin analyzing as follows:

| | Per cent |
|---|---|
| Vinyl formal (calculated as polyvinyl formal) | 82 |
| Vinyl alcohol (calculated as polyvinyl alcohol) | 8.7 |
| Vinyl acetate (calculated as polyvinyl acetate) | 9.2 | were dissolved in 1000 cc. of ethylene dichloride. 360 cc. of methyl ethyl ketone was added, followed by the immediate addition of 100 cc. of methanolic hydrochloric acid (4.6 normal). The mixture was allowed to stand for 6 hours. At the end of this period, the ethylene dichloride was removed by distillation and the residue diluted with water, whereupon it precipitated therefrom. This precipitated resin product was filtered off, washed free of acid catalyst and dried. On analysis, the product was shown to have a vinyl alcohol content (calculated as polyvinyl alcohol) of 18.8% and a vinyl acetate content (calculated as polyvinyl acetate) of 7.5%.

Still another resin was formed in accordance with the following procedure:

135 grams of polyvinyl acetal resin made by reacting partially hydrolyzed polyvinyl acetate with acetaldehyde and analyzing as follows:

|  | Per cent |
|---|---|
| Vinyl acetate (calculated as polyvinyl acetate) | 29.1 |
| Vinyl alcohol (calculated as polyvinyl alcohol) | 9.5 |
| Vinyl acetal (calculated as polyvinyl acetal) | 56.8 | was dissolved in 1000 cc. of methanol. 500 cc. of di-isobutyl ketone was then added, followed by quick addition of 400 cc. of methanolic hydrochloric acid (2.75 normal). The mixture was allowed to stand for 6 hours, at the end of which time the resin product was recovered by pouring the mixture into water with rapid stirring. The resin product was recovered by filtration, washed free of acid by water, and then dried. The product analyzed as follows:

|  | Per cent |
|---|---|
| Vinyl alcohol (calculated as polyvinyl alcohol) | 25.7 |
| Vinyl acetate (calculated as polyvinyl acetate) | 5.7 |
| Vinyl di-isobutyl ketone (calculated as polyvinyl di-isobutyl ketone) | 35.4 |
| Vinyl acetal (calculated as polyvinyl acetal) | 34.2 |

One of the main difficulties in the preparation of any polyvinyl ketal acetal resin resides in the reluctance of the ketone to react with the available hydroxyl groups. To illustrate, if polyvinyl alcohol is reacted with a ketone alone only a very small number of the available hydroxyl groups is replaced by ketal groups. For this reason, it has been difficult to introduce a large number of ketal groups into the resins by ordinary methods. Using our new process, we have been able to introduce large proportions of ketal groups into the finished polyvinyl acetal ketal resin by an exchange reaction which apparently is a reversible chemical equilibrium and in which the ratio of ketal groups and acetal groups can be varied widely by proper control of the amount of catalyst, concentration, ratio of ketone added, as well as the time of reaction. Hence, following our process, we have been able to produce resins in which high amounts of ketal groups have been introduced into the resins. With the introduction of large numbers of ketal groups, we have been able to produce resins having new and outstanding properties. Likewise, we have found an advantage in being able to use a higher ratio of ketone to aldehyde, for, in general, the ketones are as a class cheaper than the aldehydes customarily employed.

As catalysts for carrying out our method, we have found that a material of an acidic nature should be used. For example, hydrochloric acid, hydrogen-chloride, sulphuric acid, phosphoric acid, and halide salts have proved successful. Halide salts preferably should be those metals that form weak bases, such as aluminum chloride, tin chloride, or even materials like boron trifluoride.

We claim:

1. The method of preparing a polyvinyl acetal ketal resin, comprising reacting a polyvinyl acetal resin from a saturated aliphatic aldehyde in an anhydrous neutral organic solution and in the presence of an inorganic condensation catalyst of acid reaction with saturated aliphatic monoketone, allowing the reaction to proceed at approximately room temperature, and then recovering the resin product.

2. The method of preparing a polyvinyl acetal ketal resin, comprising reacting a polyvinyl acetal resin from a saturated aliphatic aldehyde in an anhydrous neutral organic solution and in the presence of an inorganic condensation catalyst of acid reaction with a saturated aliphatic monoketone, subsequently adding a saturated aliphatic monoaldehyde, allowing the reactions to proceed at approximately room temperature, and finally recovering the resin product.

3. The method of preparing polyvinyl acetal ketal resins, comprising dissolving a polyvinyl acetal resin from a saturated aliphatic aldehyde in an anhydrous neutral organic medium, adding a saturated aliphatic monoketone and an inorganic condensation catalyst of acid reaction, allowing the reaction to proceed at approximately room temperature, and then recovering the resin product.

4. The method of preparing polyvinyl acetal ketal resins, comprising dissolving a polyvinyl acetal resin from a saturated aliphatic aldehyde in an anhydrous neutral organic medium, adding a saturated aliphatic monoketone, an inorganic condensation catalyst of acid reaction and subsequently a saturated and an aliphatic monoaldehyde, allowing the reactions to proceed at approximately room temperature, and finally recovering the resin product.

JOSEPH D. RYAN.
FRED B. SHAW, JR.

REFERENCES CITED

The following references are of record in the file of this patent:

UNITED STATES PATENTS

| Number | Name | Date |
|---|---|---|
| 2,227,975 | Kenyon et al. | Jan. 7, 1941 |
| 2,310,943 | Dorough et al. | Feb. 16, 1943 |
| 2,341,306 | Agre et al. | Feb. 8, 1944 |

FOREIGN PATENTS

| Number | Country | Date |
|---|---|---|
| 483,222 | Great Britain | Apr. 8, 1938 |
| 842,066 | France | Feb. 20, 1939 |

Certificate of Correction

Patent No. 2,447,773.   August 24, 1948.

JOSEPH D. RYAN ET AL.

It is hereby certified that errors appear in the printed specification of the above numbered patent requiring corrections as follows: Column 4, line 14, claim 1, before the word "saturated" insert *a*; line 43, claim 4, strike out the words "and an"; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*